United States Patent [19]

Plumadore

[11] Patent Number: 4,461,566
[45] Date of Patent: Jul. 24, 1984

[54] DESK-TOP CAMERA/PROCESSOR-READER APPARATUS FOR ELECTROPHOTOGRAPHIC FILM

[75] Inventor: John D. Plumadore, Westfield, Mass.

[73] Assignee: Photon Chroma, Inc., Westfield, Mass.

[21] Appl. No.: 448,765

[22] Filed: Dec. 10, 1982

[51] Int. Cl.³ .......................................... G03B 13/28
[52] U.S. Cl. ...................................... 355/45; 355/65; 355/66; 355/5
[58] Field of Search .................. 355/45, 65, 66, 5, 44, 355/9

[56] References Cited

U.S. PATENT DOCUMENTS

| | | | |
|---|---|---|---|
| 3,241,436 | 3/1966 | Thornthwaite et al. | 355/66 X |
| 3,263,557 | 9/1966 | Cunningham et al. | 355/45 X |
| 3,612,678 | 10/1971 | Haslam et al. | 355/45 X |
| 3,697,176 | 10/1972 | Kuehnle et al. | 355/45 |
| 3,781,106 | 12/1973 | Lysle | 355/9 |
| 4,082,446 | 4/1978 | Driscoll et al. | 355/45 X |
| 4,286,864 | 9/1981 | Lysle et al. | 355/45 X |

*Primary Examiner*—L. T. Hix
*Assistant Examiner*—Della J. Rutledge
*Attorney, Agent, or Firm*—Schwartz & Weinrieb

[57] ABSTRACT

A desk-top camera/processor-reader apparatus for electrophotographic film includes a primary optical system of three fixed mirrors (24, 26, 28), and a pivotable mirror assembly (36) for defining optical paths between a copyboard station (12) and the microfilm (30) as well as between the microfilm (30) and a rear-projection screen (18). The pivotable mirror assembly (36) is movable between two extreme positions, the first position (36') being the camera/photographing mode, and the second position (36") being the reader/viewing mode. Camera/photographing and reader-projection lamps (42, 56) are provided for alternative energization and illumination of the copyboard station original documents and the microfilm (30). During the camera/photographing mode, the original document at the copyboard station (12) is illuminated by the photographic lamp (42) and the illuminated image is transmitted to the microfilm (30) for recording thereon by means of the three fixed mirrors (24, 26, 28), the movable mirror assembly (36) having been removed from the optical path defined between the copyboard station (12) and the film (30). During the projection mode, the film (30) is illuminated by the projection lamp (56) and the image is transmitted to the screen (18) by the three fixed mirrors (24, 26, 28) and the movable mirror (36) which has been removed into the optical path defined between the mirrors (24, 26, 28) and the copyboard station (12) so as to intercept the projected image and transmit the same to the screen (18).

20 Claims, 2 Drawing Figures

DESK-TOP CAMERA/PROCESSOR-READER APPARATUS FOR ELECTROPHOTOGRAPHIC FILM

TECHNICAL FIELD

The present invention relates generally to electrophotography, and more particularly to an improved table or desk-top camera/processor-reader apparatus for forming and/or reading imaged areas or regions upon cassette-roll or fiche type electrophotographic microfilm.

BACKGROUND ART

In accordance with conventional electrophotography technology and techniques, machinery or apparatus is of course presently available for imaging or fabricating microfilm either in a cassette or fiche format, as well as for reading of such microfilm media. However, the apparatus for performing such functions is normally separate and distinct from each other. In other words, one piece or type of apparatus is normally required to serve as the camera/processor for photographing the particular original documents and developing or processing such photographed images so as to form or fabricate the microfilm, while another piece or type of apparatus is normally required for reading or viewing the particular imaged areas or frames of the fabricated microfilm. In fact, as oftentime occurs, the two different types of apparatus are physically situated at two different locations which may be remotely spaced apart from one another by means of a considerable distance. For example, a particular entity desiring to have particular information, data, or sets of documents recorded and preserved upon microfilm, but only possessing microfilm reader apparatus, may contract with a second entity, possessing camera/processor equipment, to in fact fabricate the microfilm so as to contain the particular information, data, documents, or the like which the first entity seeks to have recorded and preserved in microfilm format. The fabricated microfilm may of course subsequently be utilized by the first entity within its reader apparatus for reading or review of the recorded microfilm information, data, documents, or the like. Alternatively, a single business entity may possess both types of microfilm apparatus, that is, the camera/processor apparatus and the reader apparatus, with the various different types of apparatus or pieces of equipment located within different departments or buildings of the single entity which may be, for example, a large corporation, a government agency, or the like.

Consequently, it may readily be appreciated that in the first exemplified instance, considerable monetary expenditures will be entailed by means of the first entity in establishing and maintaining its microfilm records in view of the contract fees it will necessarily have to pay the second entity for the fabrication of the microfilm records. In addition, substantial lapses in time will probably occur between the original generation of the original information, data, documents, or the like and the provision or transmission of such to the contracting second entity, and the return of such information, data, documentation, or the like to the first entity in the completed fabricated microfilm format. Similarly, in connection with the processing of the information, data, documentation, or the like by means of the single entity in accordance with the second exemplified instance wherein the entity possesses both type of microfilm apparatus or equipment, considerable monetary capital expenditures will be necessitated by the requirement of having to purchase at least one piece of apparatus of each type of the microfilm apparatus, that is, at least one camera/processor and at least one microfilm reader, and more accurately, probably at least several pieces of each type of apparatus depending upon the processing time requirements of the company or agency entity, the number of personnel which will be likely to be utilizing the microfilm apparatus, and other similar factors In addition, considerable periods of time may nevertheless be necessarily consumed by means of the various departmental personnel employed to process the original information, data, documentation, and the like so as to fabricate the desired microfilm media.

It is therefore seen to be a desirable objective to have microfilm apparatus which may be dual-functional in that a single piece of apparatus or equipment can photograph original information, data, documentation, or the like, and process such images into completed microfilm media, and subsequently, the same equipment or apparatus may be utilized to view or read such microfilm and the recorded information, data, documentation, or the like imaged thereon. Dual-functional or dual-mode operational microfilm appatatus per se is already known, as disclosed, for example, in U.S. Pat. No. 3,612,678 issued to Peter Haslam, Alan G. Kendall, and Anthony LaManna, and assigned to XEROX CORPORATION, however, such apparatus is concerned with the viewing or reading of a pre-fabricated microfilm, and the reproduction of enlarged photocopies of the microfilm images. Such apparatus is not intended for or designed to record original information, data, documentation, or the like onto a microfilm media, and/or to subsequently review, view, or read the microfilm images recorded thereon. Still further, it is readily appreciated that such microfilm reading and reproducing apparatus is in fact, in simplistic terms, only an accessory piece of equipment being utilized, in effect, in conjunction with conventional photocopying equipment. The latter, in turn, is seen to comprise a large floor-supported or floor-standing apparatus having the microfilm reader section thereof supported upon one end of the entire piece of equipment. The microfilm reader apparatus is also seen to be of the top-loading type wherein the microfilm is inserted within the apparatus at the upper end thereof. Consequently, it can be further appreciated that the various process steps encompassed within the viewing and reproducing functions in conjunction with the microfilm and the imaged areas recorded thereon cannot be conveniently performed by means of a single operator seated, for example, in front of the viewing screen. Loading of the microfilm into the apparatus will necessitate the operator to initially stand up in front of the apparatus, and similarly for unloading of the microfilm therefrom. Likewise, in connection with the reproduction of the microfilm images onto photocopy paper, it is likely that the operator will encounter difficulty in performing all phases of the photo-reproduction process from the aforenoted seated position.

A need has therefore existed in connection with the foregoing type of conventional apparatus for an electrophotographic microfilm dual-functional camera/processor-reader which is capable of being utilized either as a camera/processor or for imaging and developing information, data, documentation, or the like, onto the microfilm media from original documents placed within the apparatus, or alternatively, as a reader for projecting the imaged cell frames of the microfilm onto a projection screen for viewing by an operator in reviewing the data, information, documentation, or the like, recorded upon the microfilm. Such a dual-functional camera/processor-reader is disclosed in U.S. Pat. No. 4,286,864 issued to Gordon Lysle and Kenneth R. Baur, and assigned to BELL & HOWELL COMPANY, however, the disclosed system is seen to be quite complex in that there are defined, within the system, essentially two separate and distinct optical systems or paths with a rotatable mirror interposed between the two paths so as to, in effect, determine which path is to be utilized as desired depending upon whether or not an image recording or image cell frame viewing process is to be accomplished. The provision of the two separate and distinct optical systems also renders the entire system or apparatus equipment considerably more expensive than might otherwise be necessitated. In a similar manner, the provision of the two separate and distinct optical systems, aside from the rotatable mirror, renders the entire system or apparatus equipment quite expansive so as not to be as compact as might otherwise be able to be accomplished.

Accordingly, it is an object of the present invention to provide a new and improved electrophotographic microfilm camera/processor-reader.

Another object of the present invention is to provide a new and improved electrophotographic microfilm camera/processor-reader which overcomes the various operational disadvantages of conventional electrophotographic microfilm camera/processor and reader apparatus or equipment.

Still another object of the present invention is to provide a new and improved electrophotographic microfilm camera/processor-reader which is dual-functional so as to be capable of alternatively photographing and developing original data, information, documentation, or the like, upon image cell frames of the microfilm, and reading or viewing the same upon a projection screen of the apparatus or equipment.

Yet another object of the present invention is to provide a new and improved electrophotographic microfilm camera/processor-reader apparatus which is capable of accomplishing, within a single piece of apparatus or equipment, the photographing and processing/developing of image cell frames of a microfilm media encompassing photographic images of original data, information, documentation, or the like, as well as projection screen viewing of the microfilm image cell frames and the data, information, documentation, or the like contained therein.

Still yet another object of the present invention is to provide a new and improved electrophotographic microfilm camera/processor-reader apparatus which is capable of accomplishing, within a single piece of apparatus or equipment, the photographing and processing/developing of image cell frames of a microfilm media encompassing photographic images of original data, information, documentation, or the like, as well as projection screen viewing of the microfilm image cell frames containing the particular data, information, documentation, or the like, by means of a substantially single reflective mirror optical system.

Yet still another object of the present invention is to provide a new and improved electrophotographic microfilm camera/processor-reader apparatus which is capable of accomplishing, within a single piece of apparatus or equipment, the photographing and processing/developing of image cell frames of a microfilm media encompassing photographic images of original data, information, documentation, or the like, as well as projection screen viewing of the microfilm image cell frames containing the particular data, information, documentation, or the like, by means of a substantially single reflective mirror optical system whereby the entire apparatus or equipment is rendered quite compact and is able to be manufactured relatively inexpensively.

A further object of the present invention is to provide a new and improved electrophotographic microfilm camera/processor-reader apparatus which is sufficiently compact so as to render the same small enough to be capable of serving as a desk or table-top type camera/processor-reader apparatus.

A yet further object of the present invention is to provide a new and improved electrophotographic microfilm camera/processor-reader apparatus which is sufficiently compact so as to render the same small enough to be capable of serving as a desk or table-top type camera/processor-reader apparatus, and wherein all functional equipment and controls of the camera/processor-reader are readily accessible to an operator seated in front of the camera/processor-reader such that the operator can perform all necessary functions and operations attendant the photographing/developing and projection screen viewing of the microfilm media while remaining seated in front of the camera/processor-reader apparatus.

DISCLOSURE OF THE INVENTION

The foregoing and other objectives of the present invention are achieved through the provision of a new and improved electrophotographic microfilm camera/processor-reader apparatus wherein the housing thereof has a copyboard defined within the base thereof upon which an original data, information, or documentation original may be placed in a face-up orientation. A rear-projection screen is mounted within the front face of the apparatus housing above the copyboard entrance slot, and another entrance slot, into which a microfilm roll cassette or fiche may be inserted, is defined within the upper right portion of the front face of the apparatus housing so as to be disposed above and to the right of the rear projection screen. The primary optical system of the apparatus of the present invention is seen to comprise three fixed mirrors defining an optical path between the copyboard and the film cassette, and a movable mirror which is disposed rearwardly of the rear-projection screen. The last-mentioned mirror is pivotably mounted within the apparatus about a horizontal axis disposed transversely of the apparatus so as to be pivotable toward and away from the rear-projection screen about the lower end thereof. The pivotable mirror is thus able to be disposed within two extreme positions, the first of which may be designated the camera-photographing position wherein the mirror is disposed behind the rear-projection screen such that the front face of the mirror and the rear face of the rear-projection screen are disposed substantially parallel to one another, and a second position which may be designated as the viewing-reading position wherein the mirror is pivoted rearwardly so as to be disposed at an angle to the rear-projection screen.

Separate illumination means or light sources are separately energizable for the camera-photographing and viewing-reading modes, and when the pivotable mirror is disposed within its first position, the mirror is effectively removed or withdrawn from the primary optical path defined by the aforenoted three fixed mirrors. The image of the illuminated data, information, or documentation original is therefore able to be transmitted directly to the microfilm by means of the three fixed mirrors defining the primary optical system and without any interference with the pivotable mirror. In addition, the forward disposition of the pivotable mirror serves to block any light from the camera-mode illumination source from being transmitted through the rear-projection screen toward the operator's eyes. When the apparatus is being employed in its viewing-reading mode, the projection illumination source is of course energized so as to illuminate the microfilm image cell frame to be viewed, and this image is transmitted directly back toward the copyboard station by means of the primary optical system comprising the same three fixed mirrors. The pivotable mirror, however, has at the same time already been moved to its second position whereby the pivotable mirror is now disposed within the primary optical path so as to be interposed between the copyboard station and the first mirror of the optical path as defined when proceeding from the copyboard station toward the microfilm cassette. In this manner, the projected image of the microfilm image cell frame is reflected by the pivotable mirror toward the rear-projection screen whereby in fact the projected microfilm image is able to be viewed by the operator upon the rear-projection screen.

Thus, it may be seen that the electrophotographic microfilm camera/processor-reader of the present invention is characterized by a substantially simplified optical system wherein both the camera-photographing/processing and reader-viewing modes of the apparatus are able to be accomplished by means of the same fixed optical components and a single movable mirror. In effect, a single optical system is defined within the apparatus for accomplishing both the camera/processor and reader modes, with the movable mirror simply be moved into, or out of, the optical path defined by the aforenoted single optical system. No additional optical components are required, and thus the primary optical system comprising the fixed optical mirror components are capable of transmitting the illuminated image of the original document directly to the microfilm media for photographing and development, and the same optical system along with, or with the aid of, the single pivotable mirror component, can likewise transmit the particularly illuminated image cell frame from the microfilm media directly to the rear-projection screen.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

BEST MODE FOR CARRYING OUT THE INVENTION

Figure 1:
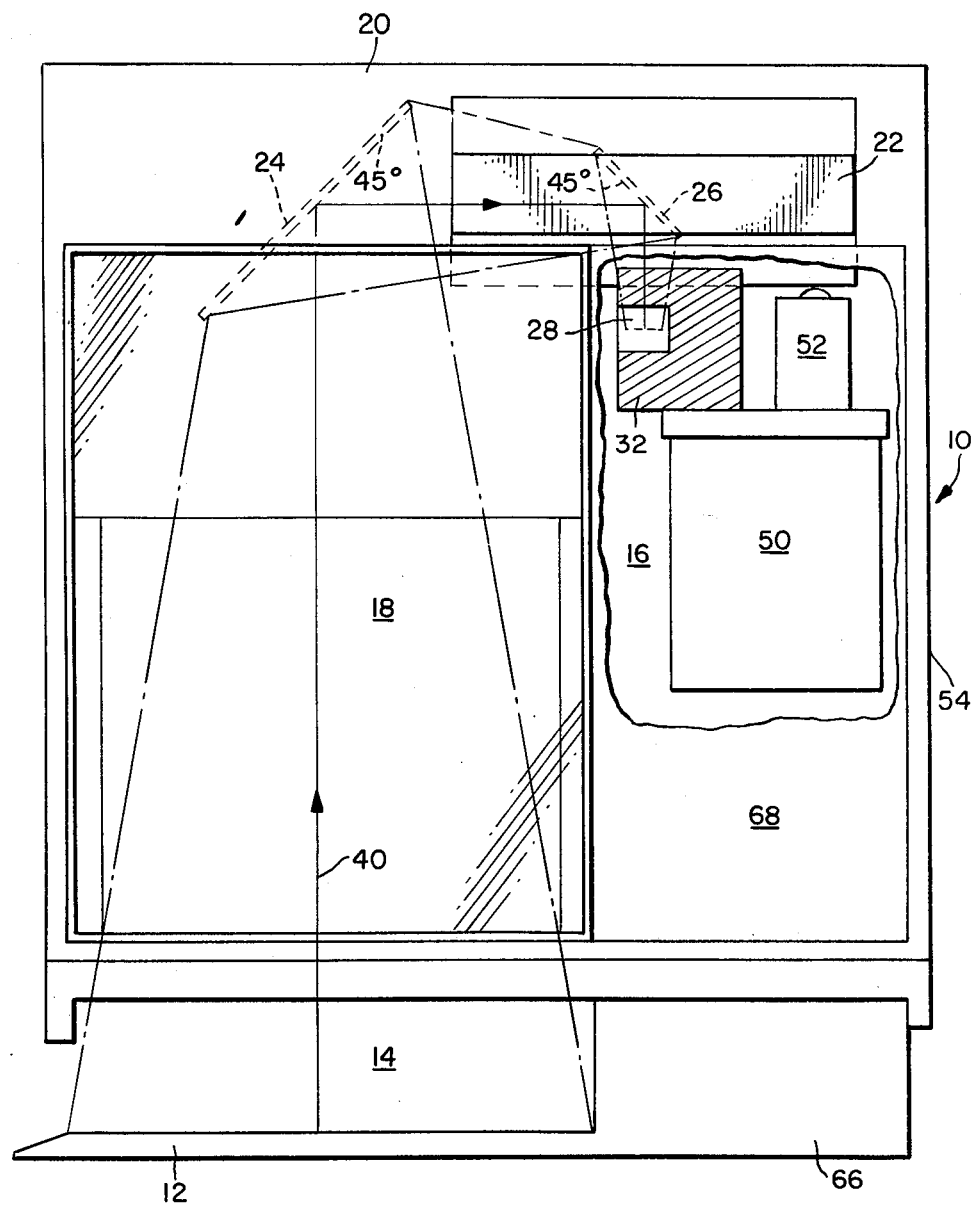
FIG. 1 is a front elevation view of the new and improved electrophotographic microfilm camera/processor-reader of the present invention showing the cooperative parts thereof as if the entire front face or panel of the apparatus housing was transparent.

Referring now to the drawings, there is shown the new and improved electrophotographic microfilm camera/processor-reader apparatus of the present invention as generally designated by the reference character 10. As may be particularly evident from reference to FIG. 1, a copy board station 12 is defined within the left side of the apparatus base upon which an original data, information, documentation, or the like, document may be placed by means of an operator. The apparatus of the present invention is adapted to be a table or desktype piece of equipment, and the disposition of the copyboard station 12 within the lower portion of the apparatus facilitates the insertion and removal of the original documents into and out of the machine, respectively, by means of the operator when, for example, the operator is seated at the desk or table upon which the apparatus is disposed, and without the necessity of having the operator to leave his or her seat, or to stand up, each time a document is in fact inserted within, or removed from, the apparatus. An entrance/removal slot 14 is defined within the apparatus 10 above the copyboard 12 so as to provide sufficient clearance for the operator's hands, as well as the original document, when a document insertion or removal operation is being performed, and it is noted that the copyboard 12 may be rendered electrostatic, by means of any well-known conventional techniques, so as to retain the original document in a flat mode upon the copyboard 12 when the original document is disposed within slot 14 and placed upon copyboard 12 in a face-up mode.

Figure 2:
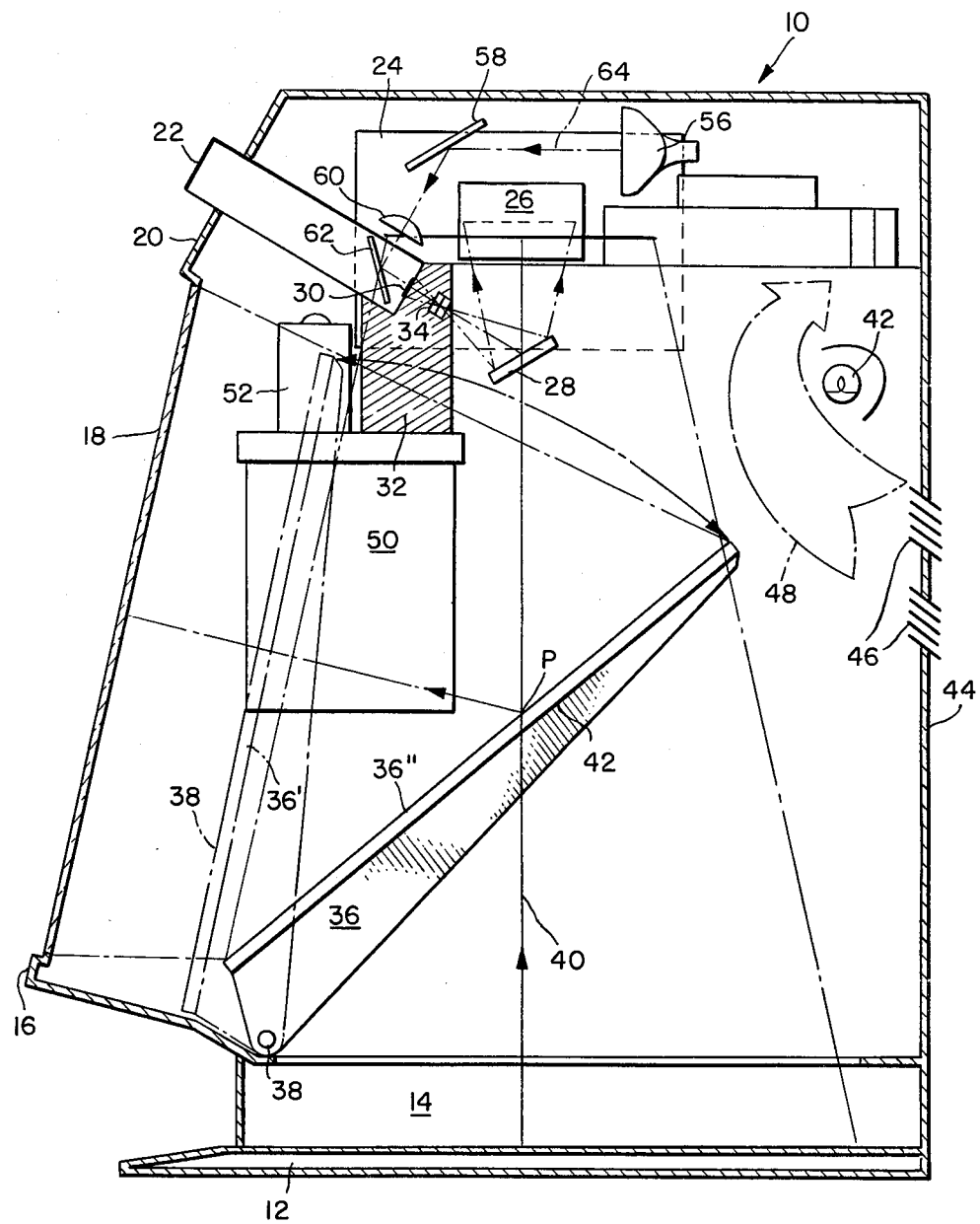
FIG. 2 is a side elevation view of the new and improved electrophotographic microfilm camera/processor-reader apparatus shown in FIG. 1 and showing the cooperative parts thereof as if the entire side face or panel of the apparatus housing was transparent.

The front face 16 of the apparatus disposed above the copyboard station 12 is angularly inclined relative to the base of the apparatus, at an angle of approximately 75°, such that the upper end of the apparatus front face 16 is disposed rearwardly of the lower end of the apparatus front face, as may best be appreciated from reference to FIG. 2. A rear-projection viewing screen 18 is mounted within the left side and central portions of the apparatus front face 16 in a recessed manner, as may also be best appreciated from FIG. 2, and above the copyboard station 12, and in this manner, the screen 18 is conveniently elevationally accessible to, and comfortably oriented with respect to, the operator seated in front of the apparatus 10.

An upper section 20 of the front face or panel of the apparatus housing is also inclined rearwardly in a manner similar to the lower section 16 of the apparatus front face or panel but at an angle of approximately 60° with respect to a horizontal plane, as best seen again with reference being made to FIG. 2. A slot is defined within this upper panel section 20 such that a microfilm roll cassette 22 may be housed within the apparatus during a microfilm recording/photographing/developing operation or a viewing/reading operation. The cassette 22 is disposed at an angle of approximately 30° relative to a horizontal plane and in a complementary angular sense relative to the inclination of upper front panel section 20. It is also noted at this juncture that while a microfilm roll cassette is disclosed for use within the apparatus of the present invention, the apparatus of the present invention is likewise capable of being utilized in conjunction with, or the camera/processing-reading of, microfiche media. Still further, while the cassette 22 is disclosed as being disposed above and to the right of the viewer projection screen 18, the cassette housing slot could be disposed to the right of the screen 18, the disclosed arrangement, however, providing a greater degree of compactness of the various components of the apparatus of the present invention.

In accordance with the primary features of the present invention, the optical system of the present invention apparatus is seen to include a first fixed mirror 24 which is disposed substantially centrally behind the rear-projection screen 18 and within the vicinity of the upper edge thereof. As best seen in FIG. 1, the first mirror 24 is disposed at an angle of 45° with respect to a horizontal plane such that the mirror extends upwardly toward the right as viewed in the FIGURE. In this manner, the reflective surface of the mirror 24 faces, or is disposed towards, the original document which is adapted to be placed upon the copyboard 12 so as to encompass an image thereof. A second fixed mirror 26 is disposed toward the right of the first mirror 24 at an angle of 45° with respect to a horizontal plane, however, the angular orientation of the second mirror 26 is opposite that of the first mirror 24 such that the second mirror 26 has its reflective surface disposed towards the first mirror 24, mirror 26 extending upwardly toward the left. The primary optical system is completed by means of a third fixed mirror 28 disposed beneath the second mirror 26 and at an angle of 30° with respect to a horizontal plane such that the mirror 28 extends upwardly toward the right as viewed in FIG. 2. In this manner, the third mirror 28 has its reflective surface disposed toward the second mirror 26 and is therefore able to capture the image of the original document disposed upon the copyboard 12 and as transmitted therefrom by means of the first and second mirrors 24 and 26, respectively. The third mirror 28 can, in turn, transmit the image onto the microfilm housed within cassette 22, the film being indicated at 30. The interior or forward end of the cassette 22 is supported upon a processor block 32, which houses the microfilm image development or processing components, such as, for example, the development electrode, the means defining the toner flow path, and the like, and it is seen that the processor block 32 also houses a focusing lens 34 for focusing the image of the original document disposed upon the copyboard 12 from the third mirror 28 onto the film 30.

As best seen with continued reference to FIG. 2, the optical system of the present invention additionally comprises a fourth mirror 36 which is pivotably housed within the apparatus housing so as to be movable between two extreme positions denoted by the reference characters 36' and 36'', the movement of the mirror being accomplished about a transverse axis 38 by suitable means, not shown. When the mirror assembly 36 is disposed within its first position 36', which may be designated the camera-mode position, the front reflective face 38 is disposed essentially parallel to the rear-projection screen 18, and it is also noted that the mirror assembly 36 is out of, or removed from, the portion of the apparatus optical path as defined between the copyboard station 12 and the first fixed mirror 24, such optical path being denoted by the reference character 40. When the mirror assembly 36 is in fact disposed in its first camera-mode position 36', a photographic exposure lamp 42 is energized by suitable controls under the control of the apparatus operator when a document copy command is imparted to the apparatus. The original copy disposed upon the copyboard station 12 is therefore illuminated, and the image thereof is transmitted to the cassette film 30 through means of the first, second, and third mirrors 24, 26, and 28, respectively, as well as focusing lens 34. In view of the fact that the fourth mirror assembly 36 has been moved to its camera-mode position 36', such mirror assembly does not interfere with the transmission of the exposed document image from the copyboard station 12 to the film 30, and the disposition of the mirror assembly in its camera-mode position 36' also serves to shield the eyes of the operator from the light of exposure lamp 42 by blocking transmission of such light through the rear-projection screen 18. In addition, the rear or back face 42 of the pivotable mirror 36 may be fabricated of patterned aluminum so as to enhance the uniform illumination properties of the apparatus and the exposure of the original document disposed at the copyboard station 12. The rear panel or wall 44 of the apparatus housing is also provided with louvers 46 extending in an upwardly direction leading interiorly of the apparatus housing. These louvers permit and facilitate the introduction of cooling air 48 into the interior of the apparatus housing for both cooling the photographic exposure lamp 42 as well as supplying positive air pressure for the development processing of the microfilm 30 during a camera/processing mode as more particularly described within co-pending U.S. patent application entitled INCLINED TONER FLOW CONTROL SYSTEM FOR DEVELOPING AN ELECTROSTATIC LATENT IMAGE UPON AN ELECTROPHOTOGRAPHIC FILM, Ser. No. 403,806, filed July 30, 1982 by the present applicant John D. Plumadore. As also disclosed more fully within the aforenoted co-pending patent application, the apparatus of the present invention additionally includes a toner bottle, receptacle, container, or the like, as denoted at 50, and a toner pump assembly 52. In order to exchange toner receptacles, or re-charge the same upon depletion thereof, the container or receptacle 50 may be simply removed from the apparatus housing through means of a suitable closure door, not shown, provided within the sidewall 54 of the apparatus housing.

When the apparatus of the present invention is to be utilized in a viewing-reader mode, the operator will impart suitable commands to the apparatus whereby the mirror assembly 36 will now be disposed within its second reader-mode position 36''. The camera-mode copyboard illumination lamp 42 is of course not energized at this time since a camera-photographing mode is not being effected, and in lieu thereof, the apparatus of the present invention is also provided with a dichroic projection lamp 56 as seen in FIG. 2. It is to be similarly understood that when a camera-photographing mode is in fact being effected with the apparatus of the present invention, projection lamp 56 is not energized. In conjunction with projection lamp 56, there is also provided within the apparatus of the present invention a dichroic reflector 58 and a condenser lens 60. A reflector mirror 62 is fixedly pre-installed within the microfilm cassette 22 behind the film 30 so as to in fact facilitate the transmission of the projection light onto the back side of the film 30 and thereby illuminate the particular image cell frame which has already been developed upon the film 30 and which is now desired to be viewed upon the rear-projection screen 18. It is to be noted in conjunction with this light transmission path that the dichroic reflector 58 is disposed at an angle of 30° with respect to a horizontal plane in the same angular orientation sense as that of third mirror such that the light from projection lamp 56, as indicated at 64, will be reflected toward the condenser lens 60 and the cassette reflector mirror 62 through an included angle of 120°. The cassette reflector mirror 62 is disposed at an angle of 45° relative to the cassette 22, and thus the reflected projection light strikes the back side of the film 30 at a 90° angle as desired. In order for the projection light to enter the cassette 22 from the condenser lens 60 and therefore strike the built-in reflector mirror 62, a window, not shown, is provided within the upper forward surface of the cassette.

Once the projection light traverses the film 30, it will be apparent that in accordance with the primary feature of the present invention, the illuminated image is transmitted to the rear-projection screen 18 by means of the same primary optical system utilized during the camera/processor mode of the apparatus, and over the same optical path, but in the reverse direction, with one exception which will be discussed shortly. In particular, the projected film cell frame image is focused by means of lens 34 onto the third mirror 28 which in turn transmits the image to the second mirror 26. The latter, in turn, transmits the image to first mirror 24 downwardly toward the copyboard station 12. Consequently, it is appreciated that up to this point, the primary optical system and path for both the camera/processor and reader modes of the apparatus are substantially identical. It is to be further appreciated at this juncture, however, that in view of the disposition of the pivotable mirror assembly 36 in its reader-mode position 36", the projected image of the particular microfilm image cell frame does not reach the copyboard station 12, but is instead, intercepted by means of the mirror assembly 36 and reflected to the rear-projection screen 18. The mirror assembly 36 is inclined at an angle of 38.5° when the same is disposed in its reader-mode 36" in order to properly reflect the image to the projection screen 18, and it is noted that the distance from a point P on the front face 38 of the mirror 36 to the projection screen 18 equals the distance from such point within the apparatus housing to the copyboard station 12 such that both the projected film cell frame image on the screen 18, and the illuminated image of the original document upon the copyboard station 12, are in proper focus without the need for altering the focal lengths of the various components of the apparatus.

It is lastly noted with respect to the apparatus of the present invention, and with particular reference being made to FIG. 1, that the apparatus process modes are all adapted to be computer-memory controlled, and in accordance therewith, the lower front face of the apparatus housing is preferably provided with a section generally designated by the reference character 66 into which computer floppy disk/program hardware/software may be inserted and housed. This section is seen to be disposed immediately to the right of the copyboard station 12, and immediately above the computer floppy disk/program section 66, there is also preferably provided a keyboard or keypad and display section 68. The keyboard components of this section are of course provided for insertion of desired command data into the apparatus which will be utilized and processed by the computer section of the apparatus, and the display portion of this section of the apparatus may include a CRT display station, not shown, for displaying the particular command data entered into the computer memory. An example of such input and displayed data, aside from, for example a COPY or ACCESS mode command, may encompass particular film cell frame access data as more particularly disclosed in co-pending United States patent application entitled ELECTROPHOTOGRAPHIC FILM HAVING HIGH-SPEED ACCESSING MEANS PRE-PRINTED THEREON, AND METHOD OF HIGH-SPEED ACCESSING THEREOF, Ser. No. 429,162, filed Sept. 30, 1982 by the present applicant John D. Plumadore.

Thus it may be seen that there has been disclosed a new and improved electrophotographic microfilm camera/processor-reader apparatus wherein the entire apparatus is rendered quite compact and particularly includes a unique optical system which is utilized in both the camera/processor and reader modes. The optical system, and the optical paths defined thereby, are identical in both modes, with the exception that a pivotable mirror assembly intercepts the optical path during the reader projection mode. Aside from this exception, the optical system and the paths defined thereby, as defined between the film and the copyboard, or the film and the projection screen, are identical. Therefore, there is no need for the provision of a second, separate and distinct, optical system for performing one or the other of the camera/processor or reader modes as in conventional systems.

Obviously, many modifications and variations of the present invention are possible in light of the above teachings. It is therefore to be understood that within the scope of the appended claims, the present invention may be practiced otherwise than as specifically described herein.

I claim:

1. A camera/processor-reader for film, comprising:
    means for supporting a film medium;
    means located at a first location for supporting a document to be photographically recorded upon said film medium as an image cell frame during a camera/processing mode;
    screen means, located at a second location different than that of said first location at which said document supporting means is located, for having the image of said document as recorded upon said film medium within said image cell frame projected thereon during a reading-viewing mode;
    illumination means for alternatively illuminating said document and said film medium during said camera/processing and reading-viewing modes, respectively;
    optical means, all of the components of which are utilized within both the camera/processing and reading-viewing modes, for defining an image transmission path between said document and said film medium, and between said film medium and said projection screen; and
    means copperating with said optical means for determining the transmission of said images either from said document to said film medium or from said film medium to said projection screen during said camera/processing and reading-viewing modes.

2. A camera/processor-reader as set forth in claim 1, wherein:

said means for supporting said document is a copyboard station defined within the base of said camera/processor-reader.

3. A camera/processor-reader as set forth in claim 2, wherein:
said copyboard station is electrostatically charged so as to maintain said document in a flattened state thereon.

4. A camera/processor-reader as set forth in claim 2, wherein:
said document is disposed upon said copyboard station in a face-up mode.

5. A camera/processor-reader as set forth in claim 1, wherein:
said optical means comprise three fixed mirrors.

6. A camera/processor-reader as set forth in claim 2, wherein:
said optical means comprise three fixed mirrors disposed along said image transmission path so as to be interposed between said copyboard station and said film medium.

7. A camera/processor-reader as set forth in claim 1, wherein:
said means cooperating with said optical means comprises a mirror movable into and out of said image transmission path defined by said optical means between said document and said film medium.

8. A camera/processor-reader as set forth in claim 7, wherein:
said mirror is pivotably movable.

9. A camera/processor-reader as set forth in claim 1, wherein:
said means cooperating with said optical means comprises a mirror movable between two positions, the first position corresponding to said camera/processing mode wherein said mirror is removed from said image transmission path defined between said document and said film medium, and the second position corresponding to said reading-viewing mode wherein said mirror is disposed within said image transmission path defined between said film medium and said document for intercepting the illuminated image of said film medium image cell frame and directing said intercepted image to said projection screen.

10. A camera/processor-reader as set forth in claim 9, wherein:
said mirror is pivotably movable.

11. A camera/processor-reader as set forth in claim 9, wherein:
when said mirror is disposed within said first position, said mirror covers said projection screen so as to prevent the light from said camera/processing illumination means from being transmitted through said projection screen.

12. A camera/processor-reader as set forth in claim 1, wherein:
said film medium comprises a roll cassette.

13. A camera/processor-reader as set forth in claim 12, wherein:
said cassette houses a reflector mirror for directing projection illumination light from said illumination means onto the back side of said film medium during said reading-viewing mode.

14. A camera/processor-reader as set forth in claim 1, wherein:
said film medium comprises microfilm.

15. A camera/processor-reader as set forth in claim 1, wherein:
said film medium comprises electrophotographic microfilm.

16. A camera/processor-reader as set forth in claim 1, wherein: said film medium comprises an updateable film.

17. A camera/processor-reader for film, comprising:
means for supporting a film medium;
means located at a first location for supporting a document to be photographically recorded upon said film medium as an image cell frame during a camera/processing mode;
screen means, located at a second location different than that of said first location at which said document supporting means is located, for having the image of said document as recorded upon said film medium within said image cell frame projected thereon during a reading-viewing mode;
illumination means for alternatively illuminating said document and said film medium during said camera/processing and reading-viewing modes, respectively;
a single set of optical means, all of the components of which are utilized within both the camera/processing and reading-viewing modes, for defining an image transmission path between said document and said film medium, and between said film medium and said projection screen; and
means cooperating with said optical means for determining the transmission of said images either from said document to said film medium or from said film medium to said projection screen during said camera/processing and reading-viewing modes.

18. A camera/processor-reader for film, comprising:
means for supporting a film medium;
means located at a first location for supporting a document to be photographically recorded upon said film medium an an image cell frame during a camera/processing mode;
screen means, located at a second location different than that of said first location at which said document supporting means is located, for having the image of said document as recorded upon said film medium within said image cell frame projected thereon during a reading-viewing mode;
illumination means for alternatively illuminating said document and said film medium during said camera/processing and reading-viewing modes, respectively;
optical means, comprising a predetermined number of components, all of which are utilized within both the camera/processing and reading-viewing modes, for defining an image transmission path between said document and said film medium, and between said film medium and said projection screen means; and
means added to or subtracted from said predetermined number of components of said optical means for determining the transmission of said images either from said document to said film medium or from said film medium to said projection screen during said camera/processing or reading-viewing modes, respectively.

19. A camera/processor-reader as set forth in claim 1, wherein:
said film medium support means is disposed within the front of said camera/processor-reader above said projection screen means.

20. A camera/processor-reader as set forth in claim 2, wherein:
said copyboard station is disposed beneath said projection screen means.

* * * * *